United States Patent [19]

Wiseall

[11] Patent Number: 5,148,229
[45] Date of Patent: Sep. 15, 1992

[54] LASER VELOCIMETRY TECHNIQUE FOR MEASURING THE THREE DIMENSIONAL VELOCITY COMPONENTS OF A PARTICLE IN A FLUID FLOW

[75] Inventor: Stephen S. Wiseall, Derby, England
[73] Assignee: Rolls-Royce plc, London, England
[21] Appl. No.: 652,030
[22] Filed: Feb. 8, 1991

Related U.S. Application Data

[63] Continuation-in-part of Ser. No. 498,894, Mar. 26, 1990, abandoned.

[30] Foreign Application Priority Data

May 6, 1989 [GB] United Kingdom ............... 8910460

[51] Int. Cl.$^5$ .................................... G01P 3/36
[52] U.S. Cl. ........................... 356/28; 356/28.5
[58] Field of Search .................... 356/28, 28.5, 4.5

[56] References Cited

U.S. PATENT DOCUMENTS

| | | | |
|---|---|---|---|
| 3,860,342 | 1/1975 | Orloff et al. | 356/28 |
| 4,537,503 | 8/1985 | Liu | 356/28.5 |
| 4,537,507 | 8/1985 | Hess | 356/28.5 |
| 4,540,283 | 9/1985 | Bachalo | 356/28.5 |
| 4,697,922 | 10/1987 | Gunter, Jr. et al. | 356/28.5 |
| 4,838,687 | 6/1989 | Pfeifer | 356/28.5 |

Primary Examiner—Stephen C. Buczinski
Attorney, Agent, or Firm—Cushman, Darby & Cushman

[57] ABSTRACT

A laser velocimetry technique for the measurement of the three dimensional components of velocity of a particle in a fluid flow has been described. It is based on the use of a measurement region consisting of two optical probe volumes. The two optical probe volumes are physically separate and each consists of an optical fringe pattern formed by the interference of two coherent beams of the same wavelength. Two of the components of velocity are determined experimentally from the doppler signals arising from the frequency change of light scattered from a particle suspended in the fluid flow as it passes through probe volumes. The third component of velocity is derived from measuring the time of flight of a particle in the fluid flow as it passes from the center of one probe volume to another probe volume.

4 Claims, 5 Drawing Sheets

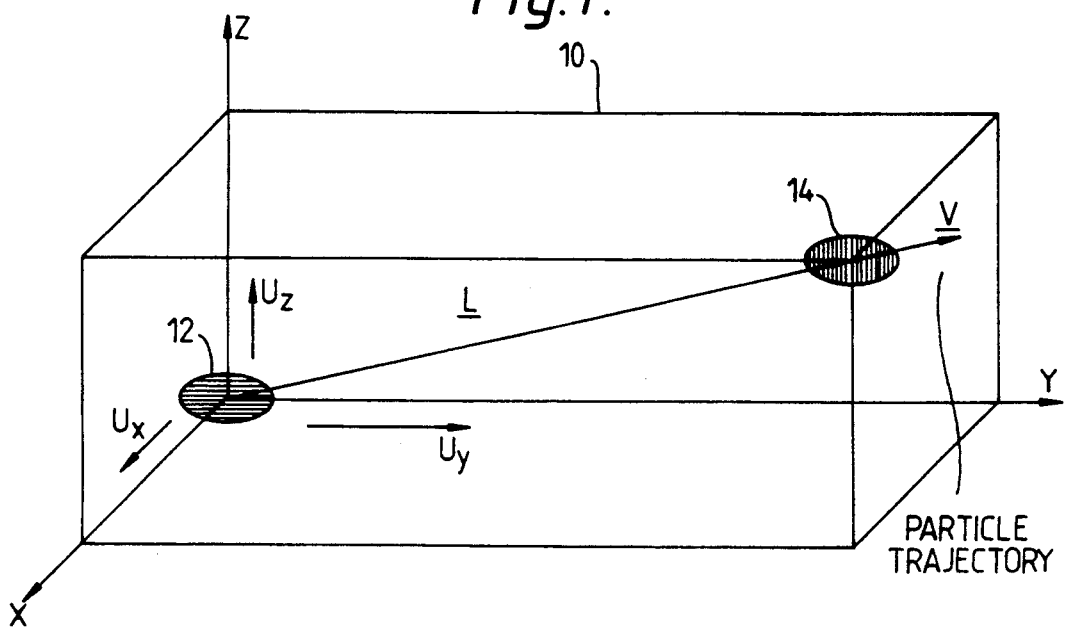
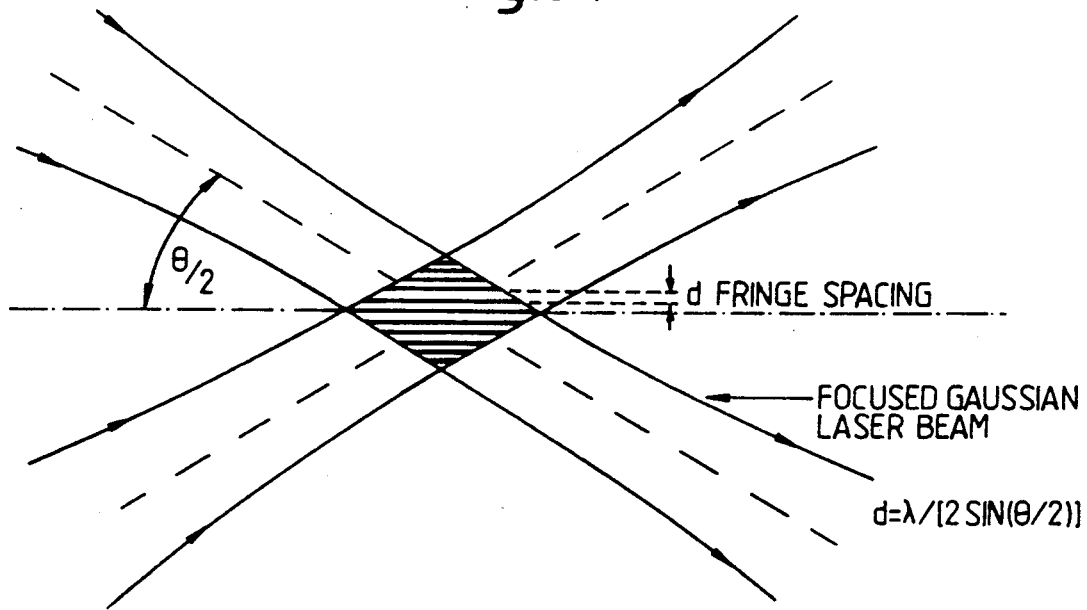

LASER VELOCIMETRY TECHNIQUE FOR MEASURING THE THREE DIMENSIONAL VELOCITY COMPONENTS OF A PARTICLE IN A FLUID FLOW

This is a continuation-in-part of application Ser. No. 07/498,894, filed Mar. 26, 1990, and now abandoned.

BACKGROUND OF THE INVENTION

1. Field of the Invention

This invention relates to a three dimensional laser velocimetry technique capable of measuring three components of velocity of a particle in a fluid flow.

2. Description of the Related Art

Optical techniques are desirable for the measurement of particle or fluid velocities as other instruments, such as physical type probes, disturb the flow at precisely the location of measurement. The non-contacting nature of laser beams has been used to measure the speed of particles at a localised region in fluid flows. The localised region in which measurement occurs is known as the probe volume and is usually characterised by focused laser beams.

The velocities of particles in a fluid flow have been remotely measured using a technique which involves the detection of laser radiation scattered from the particles suspended in the fluid as they traverse through the laser beams representing the probe volume. This technique utilises the doppler effect. Two beams of laser radiation undergo changes in their frequency when they are scattered or reflected off a moving particle suspended in the flow. The doppler difference frequency between the two scattered beams is detected as the frequency output from a photodetector. Knowledge of the doppler difference enables the velocity of the particles suspended in the flow to be calculated.

Three dimensional laser velocimetry techniques which utilise the doppler effect are known. One such technique is based on an optical measurement region containing three fringe patterns which are generated by the interference of six coherent beams of radiation. Each set of fringes is generated by the interference of two coherent beams of radiation of the same wavelength. The three fringes patterns are each of different wavelength and each is used to determine a single velocity component of a particle in the fluid flow. The three optical fringe patterns enable the three dimensional velocity vector of a particle in the fluid flow to be determined.

SUMMARY OF THE INVENTION

The present invention seeks to provide a simplified laser velocimetry technique for measuring the three dimensional velocity of a particle in a fluid flow.

According to the present invention, a method of measuring three components of velocity of a particle in a fluid flow comprises the steps of generating a first and a second probe volume, each probe volume comprising a fringe pattern of known spacing and orientation formed by the interference of two coherent beams of radiation, the first and second probe volumes are physically separated by a distance which is small compared to any spatial velocity changes in the fluid flow, an at least one particle is introduced into the fluid flow such that the particle on passing through the first and second probe volumes scatters radiation from the fringes, detecting the frequency change of the radiation scattered from the first probe volume which is directly proportional to the first component of the particle velocity perpendicular to the fringes in the first probe volume and detecting the frequency change of the radiation scattered from the second probe volume which is directly proportional to the second component of the particle velocity perpendicular to the fringes in the second probe volume and measuring the time each particle takes to travel from the centre of the first probe volume to the centre of the second probe volume so that the magnitude of the radial component of the particle velocity to be calculated for derivation of the third component of the particle velocity.

Preferably the first and second probe volumes have the same orientation.

The two coherent beams of radiation interfering to form the first probe volume are preferable of a different wavelength from the two coherent beams of radiation interfering to form the second probe volume.

Preferably the fringes in the first probe volume are orthogonal to a vertical axis and the fringe in the second probe volume are orthogonal to a horizontal axis.

BRIEF DESCRIPTION OF THE DRAWINGS

The invention will now be described by way of example and with reference to the accompanying drawings in which, FIG. 1 is a schematic view of a region in a fluid flow in which measurement of the three components of the particle velocity takes place, FIG. 5 is a ray diagram showing the formation of one of the probe volumes.

DETAILED DESCRIPTION OF THE PREFERRED EMBODIMENTS

The measurement technique uses two probe volumes 12 and 14 which are generated in a measurement region 10, through which a fluid flow passes (FIG. 1). The probe volumes 12 and 14 comprises two optical fringe patterns. The spacing of the fringes and their orientation are known and the fringe patterns are respectively of different wavelengths. Each probe volume is generated by the interference of two coherent laser beams of the same wavelength. In the preferred embodiment of the present invention an argon ion laser is used operating in the multi-line mode to generate the probe volume 12 at 488 nm and the probe volume 14 at 514.5 nm.

Figure 2:
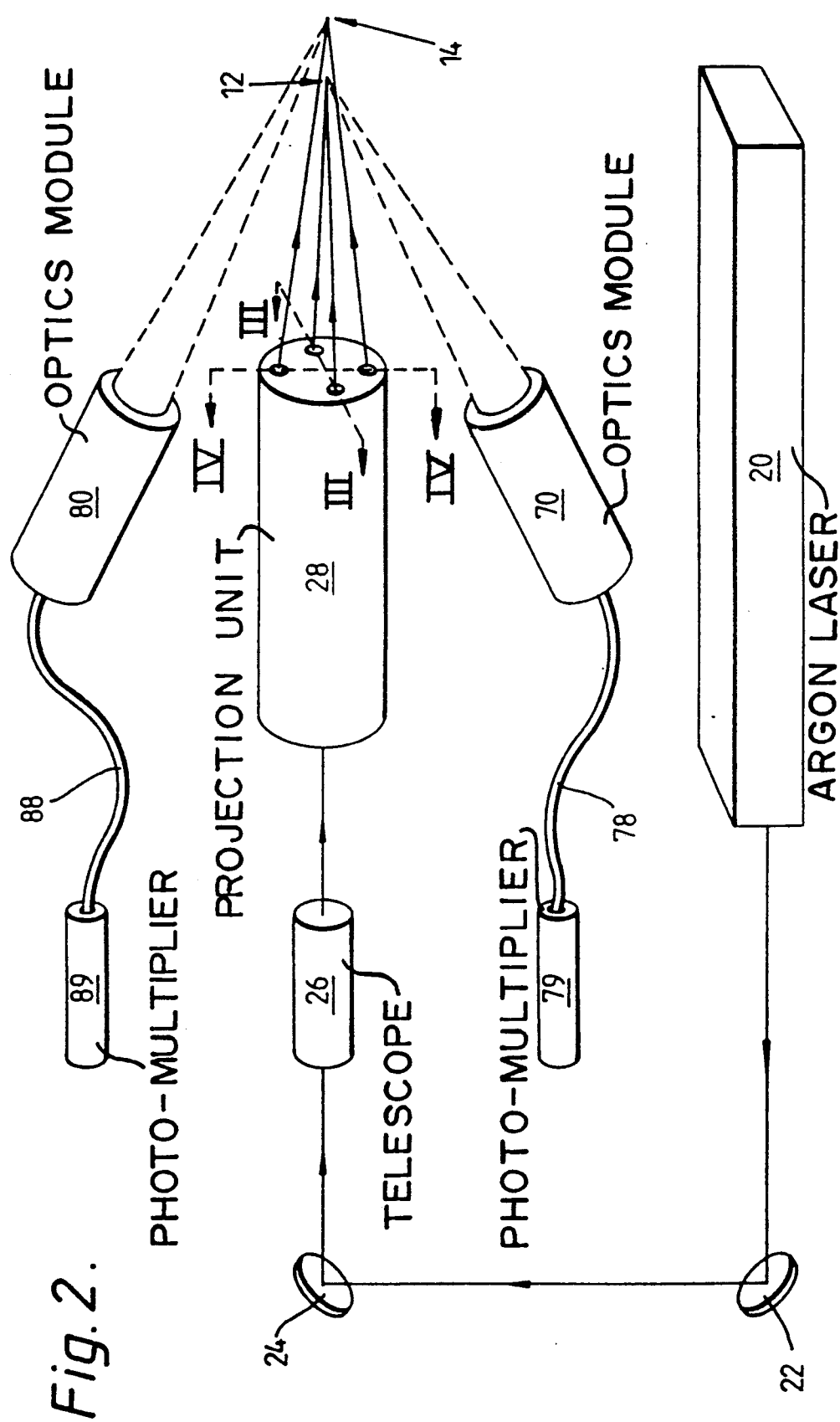
FIG. 2 is a schematic diagram of the experimental arrangement required to measure the three components of velocity of a particle in the fluid flow.
Figure 3:
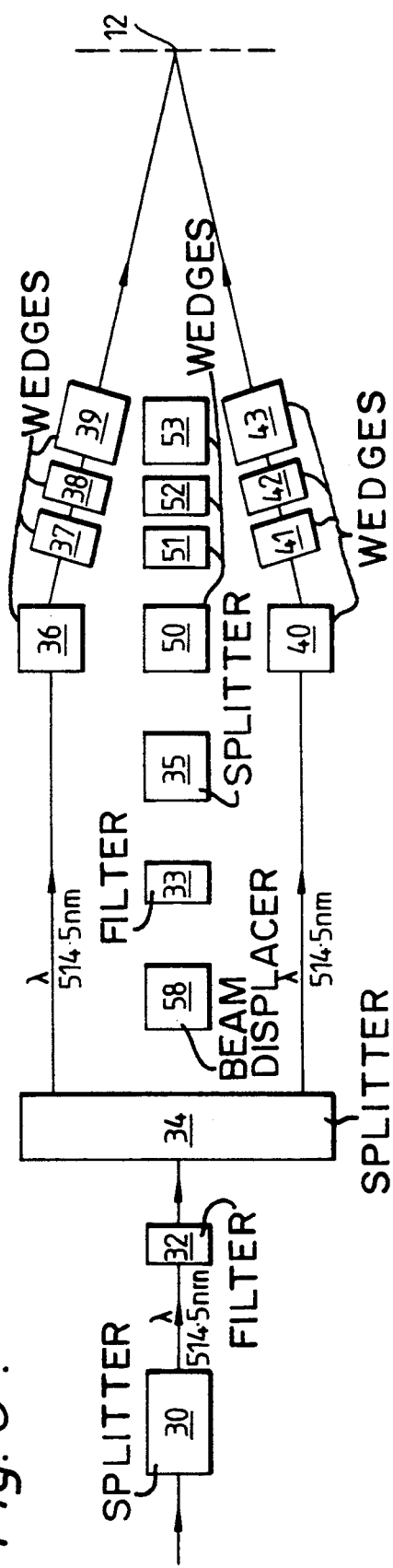
FIG. 3 is a schematic diagram of the optical components in section III—III of FIG. 2.
Figure 4:
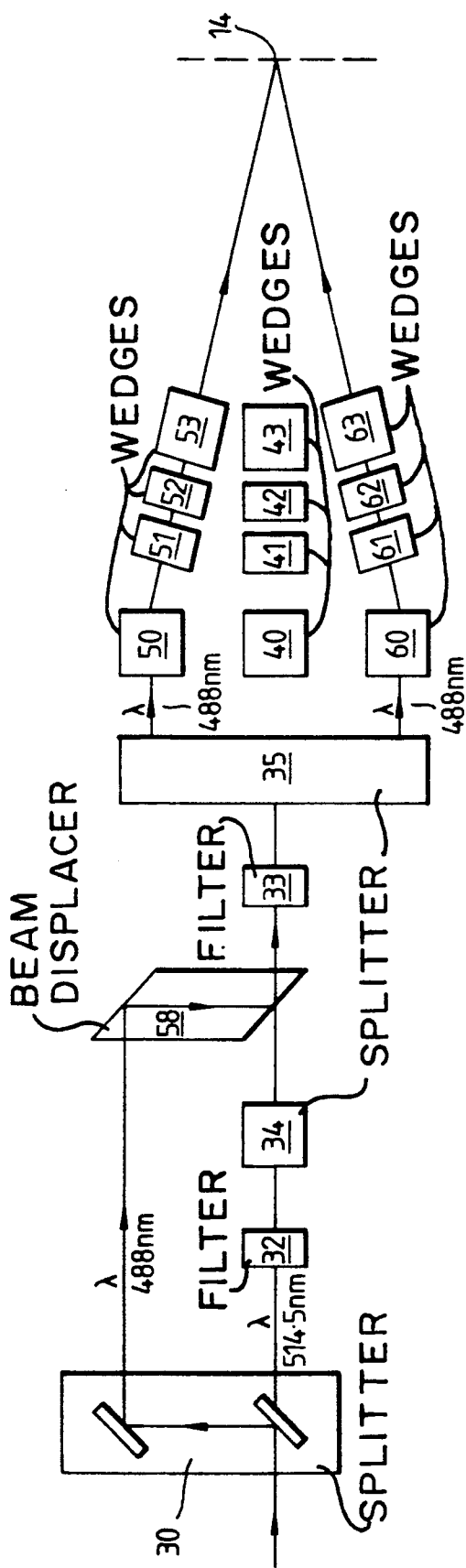
FIG. 4 is a schematic diagram of the optical components in section IV—IV of FIG. 2.

Referring to FIG. 2 the argon ion laser 20 emits a beam of coherent radiation at a number of wavelengths. The beam is directed by beam steering mirrors 22 and 24 into a beam expanding telescope 26. The beam expanding telescope 26 is used to adjust the beam diameter. The beam then passes into a projector unit 28 which contains all the associated optics to generate the two separated probe volumes 12 and 14. Schematic diagrams of the optical components in the projector unit 28 are shown in FIGS. 3 and 4. The focused beam enters the projector unit 28 and passes through a dichroic splitter 30 which separates out the beams having wavelengths of 488 mn and 514.5 nm. Optical filters 32 and 33 operating at each of these respective wavelengths remove any other wavelengths from the transmitted beams.

Referring to FIG. 3 the 514.5 nm beam passes from the dichroic splitter 30 to. a filter 32. The beam then enters the beam splitter 34 and is divided into two beams of equal power and having parallel polarisation axes. The two 514.5 nm beams are then deflected by wedges 36–38 and 40–42 to direct the beams onto a central axis. Precise adjustment on each beam is performed using the rotatable fine angle wedges, 37, 38, 41, 42 and axial translation of the final focusing lenses 39 and 43 to form two focused beams overlapping at their gaussian waists at the desired location in space. The overlapping beams interfer to produce a fringe pattern which forms the probe volume 12.

A similar arrangement is used to generated the probe volume 14 from the 488 nm beam, FIG. 4. The 488 nm beam is however deflected by the dichroic splitter 30 so a beam displacer 58 redirects the 488 nm through a filter 33 to a beam splitter 35. The beam splitter 35 divides the beam into two equal powers with parallel polarisation axes. The two 488 nm beams are then deflected by wedges 50–52 and 60–62 to direct the two beams onto a central axis. Precise adjustment of the 488 nm beams is achieved using the rotatable fine angle wedges 51, 52, 61, 62 and axial translation of the final focusing lens 53 and 63. The 488 nm beams are adjusted until they form two focused beams overlapping at their gaussian waists at the desired location in space. The overlapping beams interfer to produce a fringe pattern which forms probe volume 14.

If the polarisation of the two beams in each pair are parallel and the beam powers and focused beam diameters are equal a highly modulated fringe pattern is generated by the interference of the beams, FIG. 5. The spacing of the fringes is given by $$d = \lambda/[2 \sin(\theta/2)]$$

where $\lambda$ is the wavelength and $\theta$ is the inter beam crossing angle. The fringe patterns are ellipsoids centred on the beam crossing point. In general the orientation of the fringes in the probe volumes are parallel to the polarisation axis for the two crossing beams.

The optical fringe pattern forming probe volume 12 contains parallel interference fringes of known spacing which are orthogonal to the axis marked Z in FIG. 1. The optical fringe pattern forming probe volume 14 contains interference fringes of known spacing which are orthogonal to the axis marked Y in FIG. 1.

Positioning of the two probe volumes 12 and 14 is achieved with the use of an accurately controlled scanning pinhole and detector system mounted on an accurate high resolution 3D traverse (not shown). Various commerical systems are available for this purpose. One member of each beam pair is steered and focused onto an accurately defined position along the pinhole scan direction. The second member of each beam pair is steered and focused to overlap the first to give high quality fringes. A similar process is followed with the second beam pair at a different location set by a different traverse position. This procedure also allows the fringe spacing and probe volume separation to be accurately measured. Probe volumes 12 and 14 are generated so that their centres are separated by a distances $\underline{L}$ given by, $$L^2 = L_x^2 + L_y^2 + L_z^2 \quad (1)$$

where $L_x$ is the distance between the probe volumes 12 and 14 along the axis marked x, $L_y$ is the distance between the probe volumes 12 and 14 along the axis marked Y, $L_z$ is the distance between the probe volumes 12 and 14 along the axis marked Z.

One or more particles are introduced into the fluid flow which passes through the measurement region 10. The seeding particles can be classified into those which are naturally present in the fluid flow of interest, for example pollutants, and those which are artificially added to the flow. In the preferred embodiment the particles are artificial and are introduced into the fluid by a seeding generator. Seeding generators are available commercially and produce particles of the right size range, number density and also distributes the particles uniformly into the flow. In the preferred embodiment of the present invention particles are introduced by such a seeding generator one at a time. The majority of the particles introduced are below 0.25 microns One of the particle passes through the probe volume 12 with a velocity vector $\underline{U}$ given by;

$$U^2 = U_x^2 + U_y^2 + U_z^2 \quad (2)$$

where $U_x$ is the velocity of the particle along the axis marked X at probe volume 12, $U_y$ is the velocity of the particle along the axis marked Y at the probe volume 12, $U_z$ is the velocity of the particle along the axis marked Z at the probe volume 12.

The particle then passes through the probe volume 14 with a velocity vector $\underline{V}$ given by, $$V^2 = V_x^2 + V_y^2 + V_z^2 \quad (3)$$

where $V_x$ is the velocity of the particle along the axis marked X at the probe volume 14, $V_y$ is the velocity of the particle along the axis marked Y at the probe volume 14, $V_z$ is the velocity of the particle along the axis marked Z at the probe volume 14.

The velocity vectors of the particle at probe volumes 12 and 14 are equal if the distance $\underline{L}$ is small compared to any spatial flow velocity changes. If the turbulence is low then the spatial flow velocity changes are negligible over the distance $\underline{L}$ and the velocity vectors are assumed to be equal, so that, $$U_x = V_x \quad (4)$$

$$U_y = V_y \quad (5)$$

and $$U_z = V_z \quad (6)$$

Figure 6:
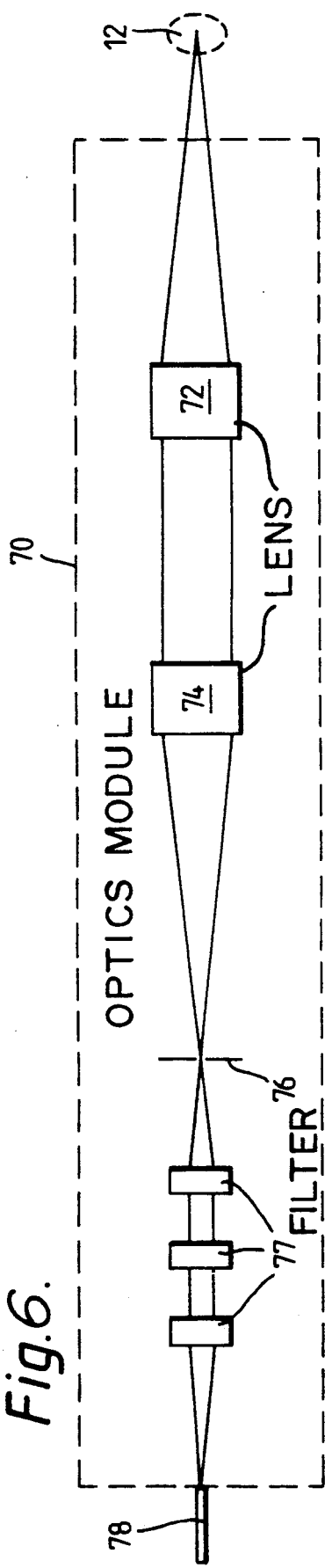
FIG. 6 is a schematic diagram of the component layout for a collection module.
Figure 7:
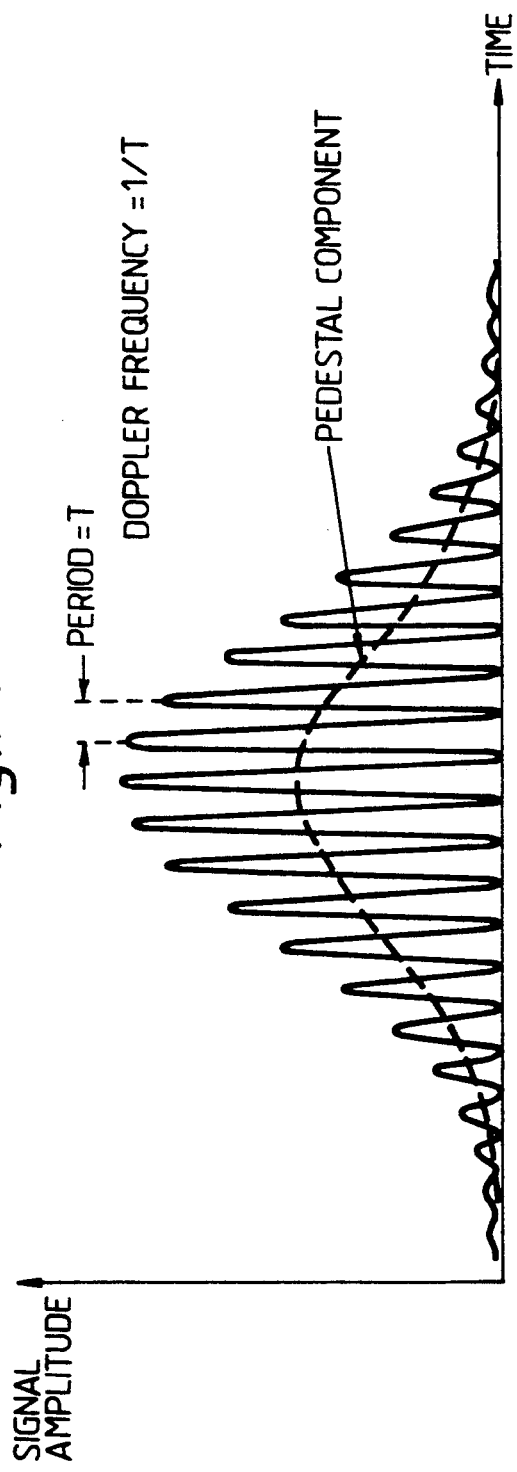
FIG. 7 is a representation of a doppler signal recorded for a particle travelling through one of the probe volumes.

The optical fringe pattern forming the probe volume 12 contains parallel interference fringes of known spacing which are generated orthogonal to the z axis. A particle passing through the probe volume 12 crosses the interference fringe and scatters light. The collection optics module 70 collects the scattered light arising from the transit of the particle through the probe volume 12 and relays it via an optical fibre 78 to a suitable photomultiplier 79 such as a photomultiplier. A schematic diagram of the optical components in the collection optics module 70 is shown in FIG. 6. A lens 72 is adjusted to collect light scattered by the particle from the centre of the probe volume 12. A further lens 74 focuses the collected light through a field stop 76 and filter 77. The field stop 76 limits the amount of light collected from the transit of the particle through the probe volume 12 which passes through the fibre optic cable 78 to the photomultiplier 79. The use of a small field stop 76 and the off axis collection lens 72 allows only the scattered light from the central region of the probe volume 12 to be collected. A highly modulated signal, FIG. 7, arises from a particle passing through the central fringe region if the particle diameter is much less than the fringe spacing. The frequency of the scattered light is measured and is proportional to the local z component of velocity. As the fringe spacing is known the particle velocity along the axis marked z can be calculated from, $$U_z = d_{12} f_{12} \qquad (7)$$

where $d_{12}$ is the optical fringe spacing in probe volume 12,
$f_{12}$ is the frequency of the light scattered by a particle passing through the probe volume 12.

For a small distance L, then from equation (6) the z component of the particle velocity is known as, $$U_z = V_z = d_{12} f_{12} \qquad (8)$$

The optical fringe pattern forming probe volume 14, contains parallel interference fringes of known spacing generated orthogonal to the axis marked Y. A particle passing through the probe volume 14 crosses the interference fringes and scatters light. The scattered light is collected by collection optics module 80 and is transmitted via a fibre optic cable 88 to a photomutiplier 89. The collection optics module 80 operates in the same way as module 70. The frequency of the scattered light is measured and is proportional to the local Y component of the particle velocity, $$V_y = d_{14} f_{14} \qquad (9)$$

where $d_{14}$ is the fringe spacing in the probe volume 14,
$f_{14}$ is the frequency of the light scattered by a particle passing through the probe volume 14.

For a small distance l, then from equation (5) the Y component of the particle velocity is known as, $$V_y = U_y = d_{14} f_{14} \qquad (10)$$

Two separate collection optic modules, 70 and 80, are used to collect the light scattered from a particle travelling through probe volumes 12 and 14 respectively. It will however be appreciated that the collection modules, 70 and 80, could be integrated into a single unit containing two collection lens or alternatively a single lens provided with means for separating out the light collected from each of the probe volumes 12 and 14 inside the module.

The use of different wavelengths for each of the probe volumes, 12 and 14 respectively, prevents light scattered from the probe volume 12 being sensed by the photomultiplier 89 which collects light scattered from the probe volume 14 and vice versa. It will however be appreciated to one skilled in the art that there are several methods by which the photomultiplier can discriminate between light scattered by the particle from each probe volume. One option would be to use laser beams at different frequencies to generate the probe volumes 12 and 14. This would require the use of for example a bragg cell or diffraction grating in the projector 28 to generate a shift in the beam frequencies. Alternatively could use optical stops so that only the light scattered from a particular probe volume can be transmitted to each of the photomultipliers. A further option is for each pair of beams used to generate each of the probe volumes to have a different polarisation. The latter is a less favourable method as it can not take into account any changes in polarisation in the light scattered from the particles.

Figure 8:
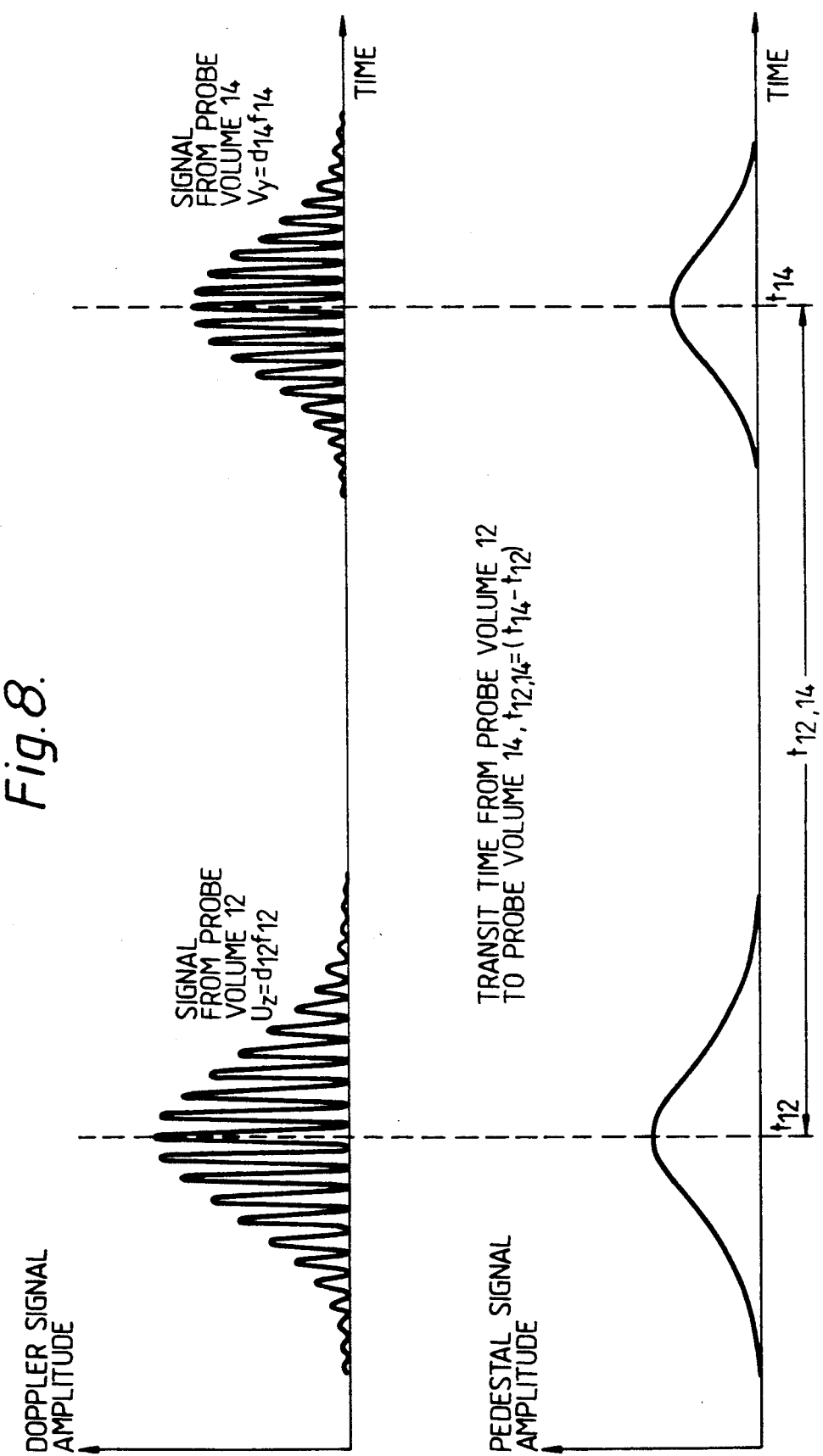
FIG. 8 is a representation of the doppler signals recorded for a particle travelling through both probe volumes and shows how the transit time for the particle between these probe volumes can be calculated.

The X component of the particle velocity is derived from a 'time of flight' measurement of the particle from the probe volume centre at 12 to the probe volume centre at 14. The time of flight for a single particle transit is the separation between the two doppler signals as shown in FIG. 8. This may be measured by low pass filtering of each doppler signal to isolate the low frequency component or pedestal whose central value corresponds to the centre of each probe volume. The two doppler signals shown in FIG. 8 arising from a particle transit through both probe volumes is processed by a signal processor. Signal processors have the option to monitor the pedestal output of each doppler signal which can be used for timing purposes. The pedestal outputs allow a timer to be started at the centre of the first pulse and stopped at the centre of the second pulse. This gives a transit time $t_{12,14}$ between the two probe volumes 12 and 14. The effect of timing errors associated in starting and stopping the timer at the centre of the pedestal signal can be reduced if the transit time across either of the probe volumes is much shorter than the time of flight. The timing process is repeated for many particles resulting in a histogram from which calculations can be done to arrive at the average transit time and the standard deviation. The effect of particles not passing through the centre of both probe volumes is reduced by collecting signals only from the central highly modulated part of each probe volume and making the distance L larger than the length of each probe volume. The time of flight for the particle to travel from 12 to 14 is given by, $$t_{12,14} = 1/V \qquad (11)$$

where $t_{12,14}$ is the time of flight of the particle to travel from the centre of probe volume 12 to the centre of probe volume 14, and V is the magnitude of the radial component of the particle velocity.

Substituting equation (11) into equation (2) we find that, $$V_x^2 = 1/t_{12,14}^2 - V_y^2 - V_z^2 \tag{12}$$

Substituting equations (9) and (10) into (12) we find that $$V_x^2 = 1/t_{12,14}^2 - (d_{14}f_{14})^2 - (d_{12}f_{12})^2$$

$V_y$ and $V_z$ are determined experimentally from the doppler signals arising from the frequency changes of the light scattered from the probe volumes 12 and 14. $V_x$ is determined from the experimental time of flight measurement for the particle travelling from the centre of probe volume 12 to the centre of probe volume 14. The three components of velocity of a particle can therefore be measured experimentally at a point in the fluid flow. If the particles are sufficiently small then they will closely follow the fluid flow path so that the velocity vector of the particle is equivalent to that of the fluid flow in the measurement region. If the inference is to be made that the particle speed is equal to the fluid speed the particles inertia must be sufficiently small for it to follow the fluctuations of the fluid flow under investigation. Sub-micron diameter particles are required for accurate measurement in high speed turbulent flows.

It will be appreciated that the fringes generated in probe volumes 12 and 14 need not be orthogonal to the axes marked z and y provided that the angle of the fringes to each respective axis is known.

Not all the particles flowing in the measurement region will pass through the probe volumes 12 and 14 due to turbulent fluctuations in the fluid flow. To maximise the data rate the vector $\underline{L}$ joining the probe volumes centres 12 and 14 should be aligned along the mean flow direction. In practice the mean flow direction of the fluid is unknown however the data events recorded can be maximised.

Particles passing from probe volume 12 spread out to form a cone as they experience a chance in their tangential velocity due to turbulence. A speculative cone diameter can therefore be calculated for any specific turbulence over the distance $\underline{L}$. If the probe volume 14 has a diameter greater than the calculated cone diameter for a given turbulence then the events recorded will be maximised as all the particles from 12 should pass through probe volume 14. Maximisation of the data events recorded can be achieved by keeping the distance $\underline{L}$ small so that the acceptance cone diameter from 12 to 14 will be less then the actual diameter of the probe volume 14.

Movement of the probe volumes 12 and 14, also maximises the data events recorded. The probe volumes can be moved until a maximum is obtained in the data events recorded. This maximum indicates when most of the particles from probe volume 12 pass through probe volume 14.

Movement of particular probe volumes will depend on whether or not either or both of the probe volumes 12 and 14 lie on the optical axis of the velocimeter.

If probe volume 12 is generated on the optical axis but probe volume 14 is not, then rotation of the velocimeter about the optical axis causes probe volume 14 to orbit around probe volume 12 which stays on the optical axis. In this way vector $\underline{L}$ between the two probe volumes is varied, the velocimeter being rotated until the data events recorded are maximised.

If neither of the probe volumes 12 and 14 lie on the optical axis of the velocimeter then rotation of the velocimeter about this optical axis will cause both probe volumes to orbit relative to one another. Both of the probe volumes orbit causing vector $\underline{L}$ to change, $\underline{L}$ is varied until the data events recorded are maximised.

Alternatively to maximise the data events recorded the optical system can be kept stationary and the whole velocimeter tilted. The two probe volumes stay in the same position relative to one another but their orientation to the mean fluid flow line is changed. The velocimeter is tilted until a peak is obtained in the data events recorded, the peak indicating when most of the particles from probe volume 12 pass through probe volume 14.

I claim:

1. A method of measuring three components of velocity of a particle in a fluid flow comprising the steps of,
    generating a first and a second probe volume,
    each of said probe volumes having a pattern of fringes of known spacing and orientation formed by the interference of two coherent beams of radiation,
    the first and second probe volumes being physically separated by a distance which is small compared to any spatial velocity changes in the fluid flow,
    introducing an at least one particle into the fluid flow such that the particle on passing through the first and second probe volumes scatters radiation from the fringes,
    detecting the frequency change of the radiation scattered from the first probe volume which is directly proportional to the first component of the particle velocity perpendicular to the fringes in the first probe volume and detecting the frequency change of the radiation scattered from the second probe volume which is directly proportional to the second component of the particle velocity perpendicular to the fringes in the second probe volume,
    and measuring the time each particle takes to travel from the centre of the first probe volume to the centre of the second probe volume from which the magnitude of the radial component of the particle velocity is calculated for derivation of the third component of the particle velocity.

2. A method of measuring three components of velocity of a particle in a fluid flow as claimed in claim 1 in which the first and second probe volumes have the same orientation.

3. A method of measuring three components of velocity of a particle in a fluid flow as claimed in claim 1 in which the two coherent beams of radiation interfering to form the first probe volume are of a different wavelength from that of the two coherent beams of radiation interfering to form the second probe volume.

4. A method of measuring three components of velocity of a particle in a fluid flow as claimed in claim 1 in which the orientation of the fringes in the first probe volume is such that said fringes are orthogonal to a vertical axis and the orientation of the fringes in the second probe volume is such that said fringes are orthogonal to a horizontal axis.

* * * * *